United States Patent [19]

Kerschbaum

[11] 4,020,344
[45] Apr. 26, 1977

[54] MOBILE INFRARED APPARATUS FOR MAPPING THERMAL VARIATIONS AND METHOD EMPLOYING SAME

[75] Inventor: Richard Lynn Kerschbaum, Ann Arbor, Mich.

[73] Assignee: Daedalus Enterprises, Inc., Ann Arbor, Mich.

[22] Filed: July 7, 1975

[21] Appl. No.: 593,208

[52] U.S. Cl. ............................... 250/330; 250/338; 250/340; 250/342

[51] Int. Cl.² ........................................... G01J 1/02

[58] Field of Search .......... 250/253, 330, 332, 334, 250/338, 340, 342; 52/514, 741

[56] References Cited
UNITED STATES PATENTS

| | | | |
|---|---|---|---|
| 2,716,193 | 8/1955 | Riolo | 250/330 |
| 3,056,958 | 10/1962 | Anderson | 250/340 X |
| 3,278,746 | 10/1966 | Fiat | 250/253 |
| 3,791,097 | 2/1974 | Cassella et al. | 250/340 X |
| 3,886,359 | 5/1975 | Cheek, Jr. et al. | 250/342 X |

Primary Examiner—Archie R. Borchelt
Attorney, Agent, or Firm—Barnes, Kisselle, Raisch & Choate

[57] ABSTRACT

Heat loss is detected by means of an infrared scanner mounted on a wheeled vehicle that moves along a horizontal path. The scanner is arranged to view a thermal scene along vertical scan lines transverse to the vehicle path, and corresponding electrical signals are recorded for subsequent playback and processing into a continuous strip map. The strip map can then be interpreted to locate potential areas of high heat loss which can then be confirmed by physical inspection.

16 Claims, 3 Drawing Figures

MOBILE INFRARED APPARATUS FOR MAPPING THERMAL VARIATIONS AND METHOD EMPLOYING SAME

This invention relates to the detection of heat loss in buildings, industrial complexes and the like and, more particularly, to a mobile infrared scanner for generating a continuous infrared image of a thermal scene.

With the current emphasis on energy conservation, a need has developed for rapidly and effectively locating heat loss from the sides of homes, offices, industrial plants and other buildings as well as from industrial and chemical processing equipment such as storage tanks, pipes, cracking towers, transformers and the like. Although infrared technology has been used in the past for detecting thermal variations, the prior art techniques have generally failed to provide any economical and effective way for acquiring accurate thermal data in vertical elevation over long horizontal paths. Of course, airborne infrared detection equipment, for example, of the type described in the United States Parker et al U.S. Pat. No. 3,752,915, granted Aug. 14, 1973, is capable of generating an aerial strip map which can be interpreted to locate areas of heat loss. Although aerial infrared strip maps are useful for numerous applications, in general, the data is not in a form that enables accurate resolution in a vertical direction to pinpoint a specific area of high heat loss. The United States Cassella et al U.S. Pat. No. 3,791,097, granted Feb. 12, 1974, also suggests using airborne infrared equipment to locate subsurface water indicative of damage in the roof of a building.

Ground-based infrared systems have also been used to look at buildings and industrial equipment in elevation. For example, a portable camera has been used to develop a raster-scanned frame image, much like a conventional television receiver. One such system is described on pages 49–51 of "The Oil and Gas Journal" of May 22, 1972. Although such a raster-scanned system is of limited value for imaging a specific limited area of likely heat loss, it is totally impractical for large-scale data acquisition. At best, such a portable system could be used to view individual scenes with a record of each scene being made, as by photographing, and then the photographs pieced together to provide a mosaic of a larger ground scene. Using this technique for data acquisition, it will be apparent that the infrared camera would be first located for a first scene and then moved from scene to scene to obtain separate images. This method of data acquisition would be very inefficient. Moreover, the techniques to mosaic individual thermal images into a large useful map are complex and time consuming. For the foregoing reasons, portable infrared cameras have only limited use.

The objects of the present invention are to provide an infrared imaging method and apparatus that overcome the aforementioned disadvantages of a raster-scan imaging technique; that provide effective and practical infrared imaging of a ground scene in elevation over a long, if not unlimited, horizontal path; and/or that facilitate detection and reduction of high energy loss at buildings and the like.

A further object of the present invention is to provide an infrared imaging method and apparatus that provide an effective and practical strip map of an elevational ground scene.

Still further objects of the present invention are to provide an effective, efficient and practical method and appartus for detecting energy loss at structures located on the ground.

Other objects, features and advantages will be apparent from the following description, the appended claims and the accompanying drawings in which:

Figure 1:
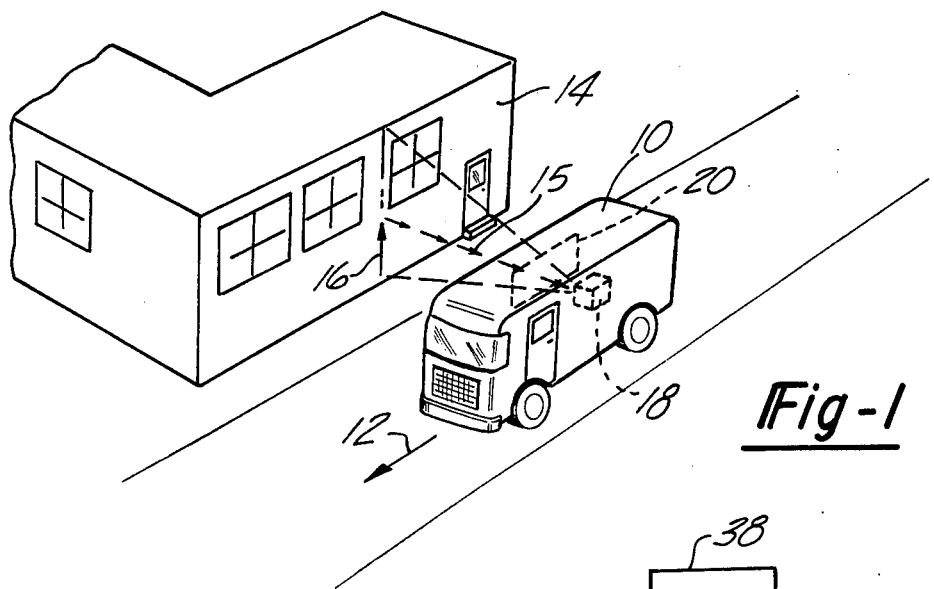
FIG. 1 is a perspective view schematically illustrating the acquisition of infrared data by means of a mobile scanner mounted in a wheeled vehicle.

Referring in greater detail to the drawings, a van 10 is illustrated moving on the ground along a generally horizontal path illustrated by arrow 12 past an elevational thermal ground scene including a building 14. Infrared data 15 is acquired along vertical scan lines, one of which is indicated at 16, as van 10 moves past the scene. The thermal data is received at an infrared scanning and detection system 18 mounted in van 10 that views the scene through a suitable window 20 in the van. As van 10 moves at a substantially constant speed, a series of adjacent scan lines is acquired to provide continuous panoramic coverage of all objects within the field of view of the scanning system 18.

Figure 2:
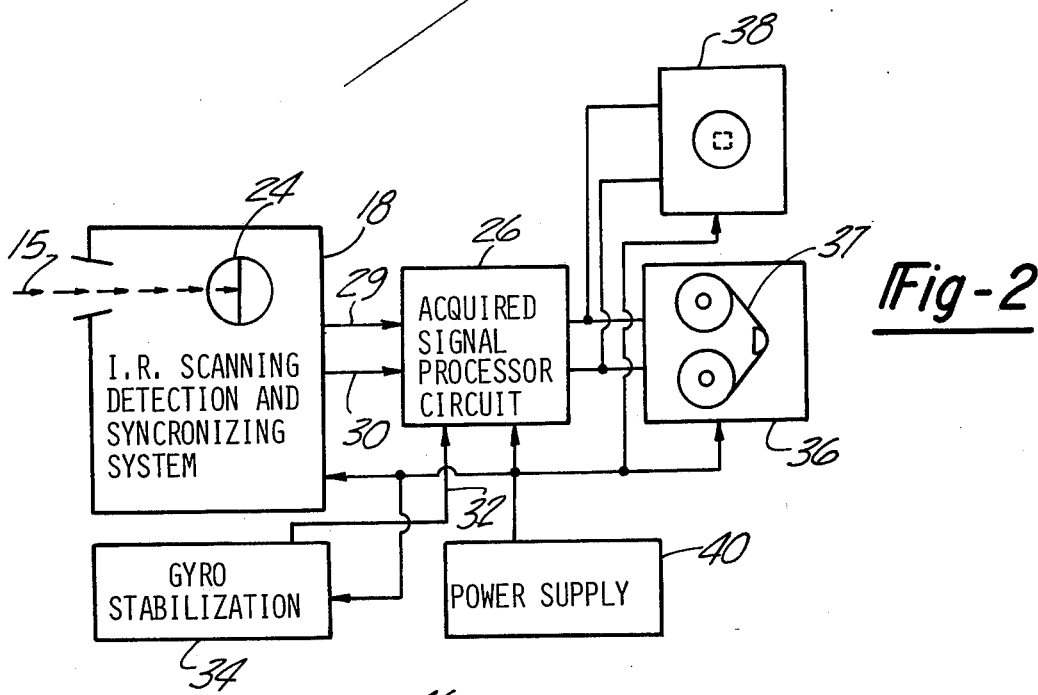
FIG. 2 is a block diagram of the infrared data acquisition system mounted in the vehicle of FIG. 1.

FIG. 2 shows the infrared scanning and detection system 18 together with the other components carried in the van 10. Although various different types of linescan infrared detection equipment could be used, the preferred system shown in FIG. 2 is basically the same as that more fully described in the aforementioned Parker et al patent (which is hereby incorporated by reference), except that the scanning system is oriented in van 10 to acquire data along vertical scan lines. Inasmuch as the scanning and detection system 18 per se is not a part of the present invention, it will be described only to an extent necessary to understand the present invention, it being understood that a detailed description of the same is set forth in the aforementioned Parker et al patent.

As schematically shown in FIG. 2, a scanning mirror 24 is oriented for rotation on a horizontal axis to acquire the thermal data 15 along vertical scan lines. The apparatus 18 includes conventional scanning detection and synchronizing circuits of the type set forth more fully in the aforementioned Parker et al patent, to generate a thermal signal that is fed to the acquired signal processor circuit 26 on line 29 along with suitable synchronizing signals on line 30. Circuit 26 also receives a gyrostabilization signal on line 32 from a gyrostabilization circuit 34 and processes the three signals on lines 29, 30 and 32 into a composite video signal that is fed along with the synchronizing signals to recorder 36 for recording on respective tracks of magnetic tape 37 on the recorder. The composite video signal and synchronizing signals may also be fed to an on-board monitor 38 for real-time viewing of the data as it is acquired. the gyrostabilization circuit 34 corrects for distortion in the thermal signal on line 29 introduced by motion of the van 10 along a horizontal roll axis that extends in the direction of travel 12. Hence the gyrostabilization signal corrects for distortion caused by bumps in the roadway and sway in the van. It has been found that a separate power supply 40 is highly desirable to eliminate distortion that might otherwise be introduced in the image due to fluctuation in the output of the vehicle power supply. Power supply 40 is independent of the vehicle power supply and may be an isolated battery supply or a closely regulated DC generator.

Figure 3:
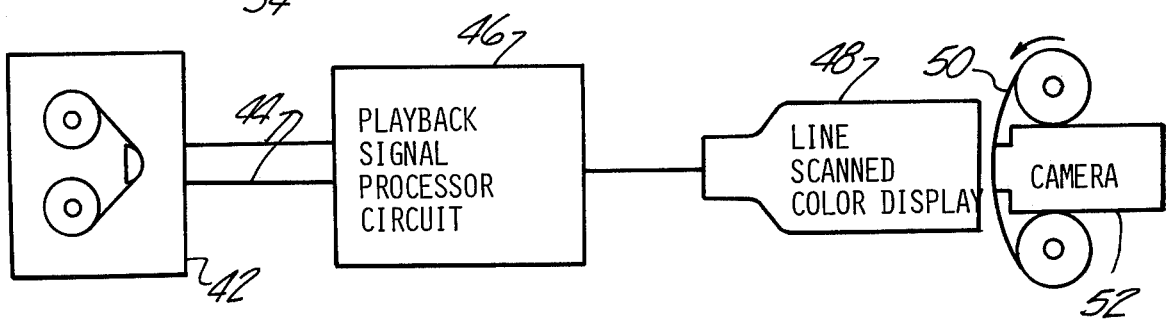
FIG. 3 is a block diagram of a data processing system used to interpret the data acquired by the mobile system of FIGS. 1 and 2.

The preferred form of playback and processing circuitry, again along the lines of that disclosed in the aforementioned Parker et al patent, is shown in FIG. 3 wherein the original thermal video and synchronizing signals are reproduced by a magnetic tape reproducer 42 and fed via respective lines 44 to a playback signal processor circuit 46. The processed signals from circuit 46 are used to gate appropriate guns in a line-scan color display 48 whose image is recorded on color film 50 by a color camera 52 as the film is moved transversely to the scan line on display 48 so that a continuous map in strip form is exposed on film 50.

Although various different techniques for line-scan data aquisition processing and display can be used, the afore-described techniques are preferred and indeed are implemented by only minor modification of the airborne infrared systems described in the aforementioned Parker et al patent. This is particularly advantageous since sophisticated infrared equipment is reasonably expensive, and hence the multiple application for a given piece of equipment provides cost justification for the use of the sophisticated equipment for a mobile van application. Moreover, the mobile data aquisition of an elevational scene may be used in conjunction with an aerial strip map. As set forth more fully in the aforementioned Parker et al patent, thermal ground data can be acquired by flying an aircraft along a predetermined flight path over a ground scene while thermal ground data is simultaneously acquired from the ground scene along horizontal scan lines generally transverse to the flight path. The same piece of equipment can be used to acquire the aerial data and then can be transferred to a rented van to acquire the ground elevation data, or vice versa. The basic system shown in block form in FIG. 2 for airborne application can be modified on site for mounting in van 10 to scan along vertical scan lines. The nitrogen cooling system is reoriented and the appropriate infrared sensor is selected for the range of interest. Preferably, the sensor is mounted to provide for variable focusing for the shorter ranges as compared to airborne infrared. Simple shims can be used at the sensor mounting or other suitable adjustment made in the optical system.

By way of further example, in one embodiment of the present invention, the infrared sensor was a 1 milliradian detector of the mercury-cadmium-telluride type operating in the 9 to 12 micrometer range. The optical system was focused at approximately 100 feet and the scanner was mounted on a plate at about a 10° slope to horizontal to provide a vertical field of view of approximately 28.5° above horizontal and 48.5° below hoizontal. Suitable video gates in the playback processing circuitry are adjusted to print only approximately the upper 40° which will contain the desired target information, i.e., information contained in approximately 10° below horizontal and 30° above horizontal. The vertical scanning was at a speed of approximately 80 per second and the van was traveling at 6 miles per hour. In general, infrared detector operating in the 2 to 14 micrometer wavelength region could be used to provide useful data, but detectors operating in a more restricted band of say 9 to 12 micrometers would be preferred. Dual range infrared sensors could also be used and visual or multispectral sensors could also be used together with the infrared sensors.

In operation, as van 10 moves along the horizontal path 12, infrared data is acquired according to thermal variations in an elevational scene. The data is acquired in substantially continuous panoramic form much like data acquisition in airborne strip mapping techniques and can be recorded by suitable means such as by tape recorder 36 and monitored as by monitor 38. If the operator notes some particular infrared anomaly of interest on monitor 38, the van can be stopped and more detailed information acquired at that time. It will be apparent that data can be acquired rapidly over any desired path without any limitation on horizontal distance. A driver can acquire data along entire streets in a short period of time and the data can be processed and interpreted at some later, more convenient date. The mobile system, whether in a van 10 or other type of mobile wheeled vehicle, can also move along a prescribed route through an outside industrial installation such as chemical and petroleum processing installations and acquire a large volume of infrared data in a relatively short period of time as compared to that required for data acquisition by a raster-scan infrared camera.

After the data is acquired and processed into a continuous strip map of the elevational thermal scene, the map can be interpreted using substantially the same techniques as those used in airborne infrared strip map interpretation. By recording raw data, conventional image enhancement techniques can be used when the data is subsequently processed. After analysis of the thermal strip map, it is a simple matter to go back to the site for more detailed investigation of areas showing anomalous thermal conditions. Monitor 38 can also be arranged to generate a continuously changing frame image for real-time evaluation and photographing. In either event, when a particular thermal anomaly is noted, the structure producing the anoamly can then be physically inspected to confirm the presence or absence of undesirable heat loss. The high heat loss area can then be repaired. The present invention has been used in test runs of residential areas and office buildings, and "hot spots" on the buildings are readily identifiable out of a mass of data so that the job of locating undesirable heat loss is then confined to an evaluation of those specific areas. The present invention has also been used to acquire data in outside industrial installations and to pinpoint excessive heat at an electrical transformer, valves, storage tanks, pipe lines and the like.

It has also been found, contrary to original expectation, that improved imagery is obtained with reasonably simple gyrostabilization similar to that used to correct for aircraft roll, for example, gyrostabilization of the type disclosed in the aforementioned Parker et al patent. The gyrostabilization was incorporated in the van-mounted unit and oriented to correct for roll about a horizontal axis in the direction of travel. It was not anticipated that a simple gyrostabilization of correction about a single horizontal axis would correct for distortion introduced by random bumps and swaying of the van. However, the results were very effective. As indicated above, in addition to the principal application for detecting heat loss, it will be apparent that the present invention can also be used to detect abnormal operating conditions and defective components indicated by excessive heat as in the case of the afore-mentioned transformers and valves.

It will be understood that the mobile infrared apparatus for mapping thermal variations and methyl employing same have been described hereinabove for purposes of illustration and are not intended to indicate limits of the present invention, the scope of which is defined by the following claims.

I claim:

1. The method of detecting and correcting for heat loss in a ground-located structure comprising viewing a thermal ground scene in elevation by scanning said scene along vertical scan lines by means of a thermal detector while simultaneously moving said detector horizontally along said scene to acquire thermal data along vertically adjacent scan lines in a non-raster scan manner so as to provide continuous panoramic coverage of said scene in a horizontal direction corresponding to the horizontal movement of said detector, locating radiation anomalies in said data representing likely areas of high heat loss, physically examining that ground-based structure corresponding to an anomaly so located to confirm the presence or absence of high heat loss and then repairing those portions of said structure where high heat loss has been so confirmed.

2. The method set forth in claim 1 wherein electrical signals representing said thermal data are generated, said electrical signals are recorded on magnetic tape, said recorded signals are processed by means of a line-scanned display and a film strip camera to obtain a rendition of said scene on a continuous film strip, and wherein radiation anomalies are located by interpreting said film strip.

3. A method of developing a panoramic elevational scene of thermal variations for use in detecting thermal energy at ground-base structures which have vertical dimensions comprising acquiring thermal data from said scene by scanning said scene with a thermal sensor along substantially vertical scan lines a line at a time in a non-raster manner while simultaneously moving said sensor along a horizontal path generally parallel to and along said scene and generally transverse to said scan lines so as to acquire thermal data laterally of said path and along a plurality of adjacent vertical scan lines to provide continuous panoramic coverage of said scene in vertical elevation along said path.

4. The method set forth in claim 3 wherein said sensor is moved horizontally by mounting scanning means including said sensor in a wheeled vehicle and then moving said wheeled vehicle along said horizontal path.

5. The method set forth in claim 3 wherein thermal data is acquired by using an infrared detector operating in a wavelength range of substantially 2 to 14 micrometers.

6. The method set forth in claim 5 wherein said detector is operating in the wavelength range of from 9 to 12 micrometers.

7. The method set forth in claim 3 wherein said sensor is moved along said horizontal path at a substantially constant velocity.

8. The method set forth in claim 3 wherein an electical signal is generated by said sensor representing variations in said thermal scene, said sensor is included in a scanning mechanism, deviations of said scanner system about a horizontal roll axis extending in the direction of horizontal travel are sensed by gyrostabilization means to provide an error indication, and wherein said electrical signal is corrected according to said error indication.

9. The method set forth in claim 3 wherein each vertical scan line encompasses an angle of from approximately at least 10° below horizontal to 30° above horizontal.

10. The method set forth in claim 3 wherein said sensor generates electrical data signals representing said thermal data from said scene and wherein said signals are stored on recording media for subsequent processing and wherein said signals are subsequently processed by means of a line-scanned display to provide a continuous panoramic strip map of said scene.

11. Apparatus for acquiring thermal data of an elevational ground scene comprising a wheeled vehicle, and an infrared scanning and detection system for the non-raster scanning type mounted on said vehicle and arranged and disposed to acquire thermal data from said scene along vertically adjacent scan lines generally transverse to a horizontal path traveled by said vehicle so that when said vehicle moves along said path, continuous panoramic coverage of said scene is obtained.

12. The apparatus set forth in claim 11 further comprising gyrostabilization means to correct for distortion caused by roll of said vehicle about a horizontal roll axis extending in the direction of vehicle travel.

13. The apparatus set forth in claim 11 wherein said vehicle has an electrical system including a battery and wherein said scanning and detection system comprises a power supply independent of said vehicle electrical system and said battery.

14. The apparatus set forth in claim 11 wherein said scanning and detection system provides an electrical signal representing thermal variations in said scene and wherein said apparatus further comprises a magnetic tape recorder to record said signals for subsequent processing.

15. The apparatus set forth in claim 11 wherein said vehicle is a self-propelled vehicle adapted to be driven by an operator.

16. The method of acquiring thermal data comprising flying an aircraft along a predetermined flight path over a ground scene while thermal ground data is simultaneously acquired from said ground scene along horizontal scan lines generally transverse to said flight path, said data being acquired by means of a scanning and detection apparatus, removing said apparatus from said aircraft and mounting said apparatus in a wheeled vehicle with said apparatus being oriented to acquire elevational thermal data along generally vertical scan lines from the same scene from which data is acquired with the airborne system and then moving said vehicle along a horizontal path while thermal data is being acquired along a plurality of adjacent vertical scan lines to provide continuous panoramic coverage of said scene in vertical elevation along said horizontal path.

* * * * *